Oct. 18, 1932.　　A. G. RONNING ET AL　　1,883,402
HARVESTING MACHINE
Filed Aug. 8, 1927　　7 Sheets-Sheet 4
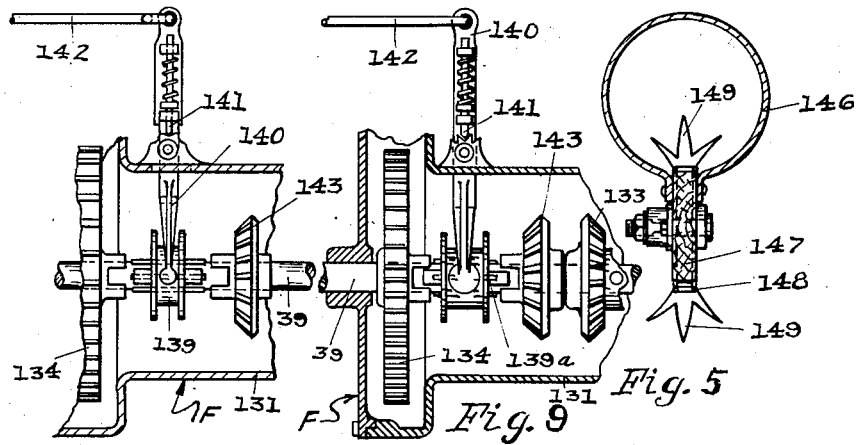
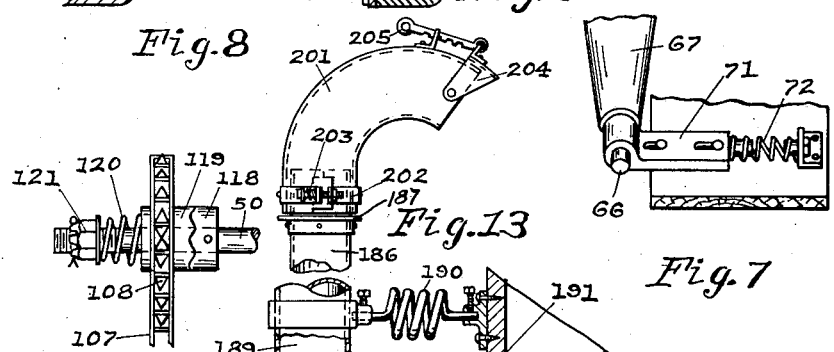
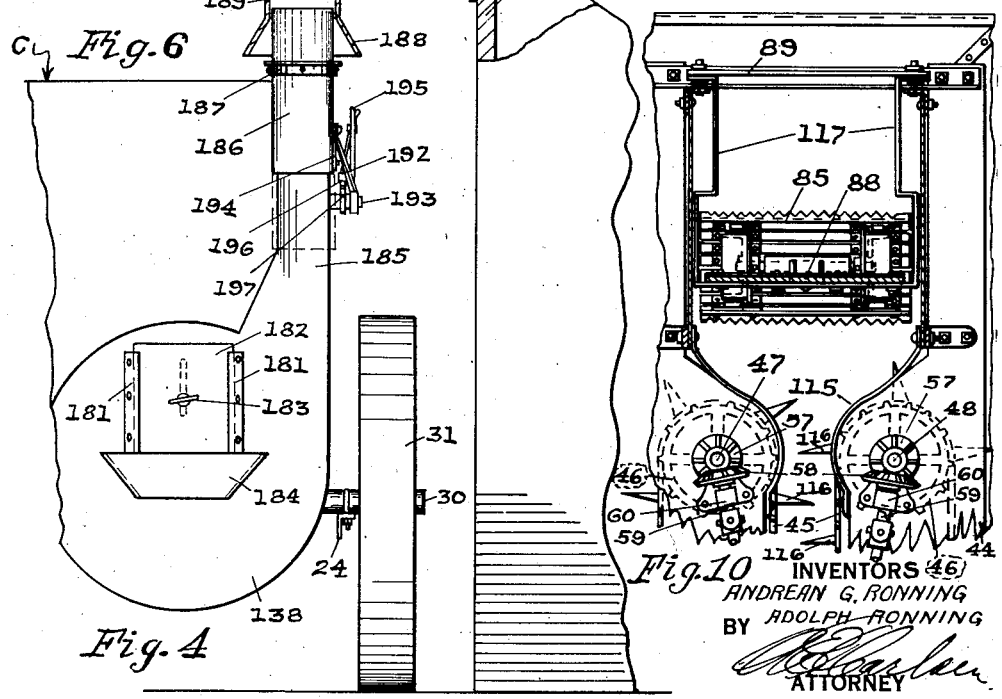

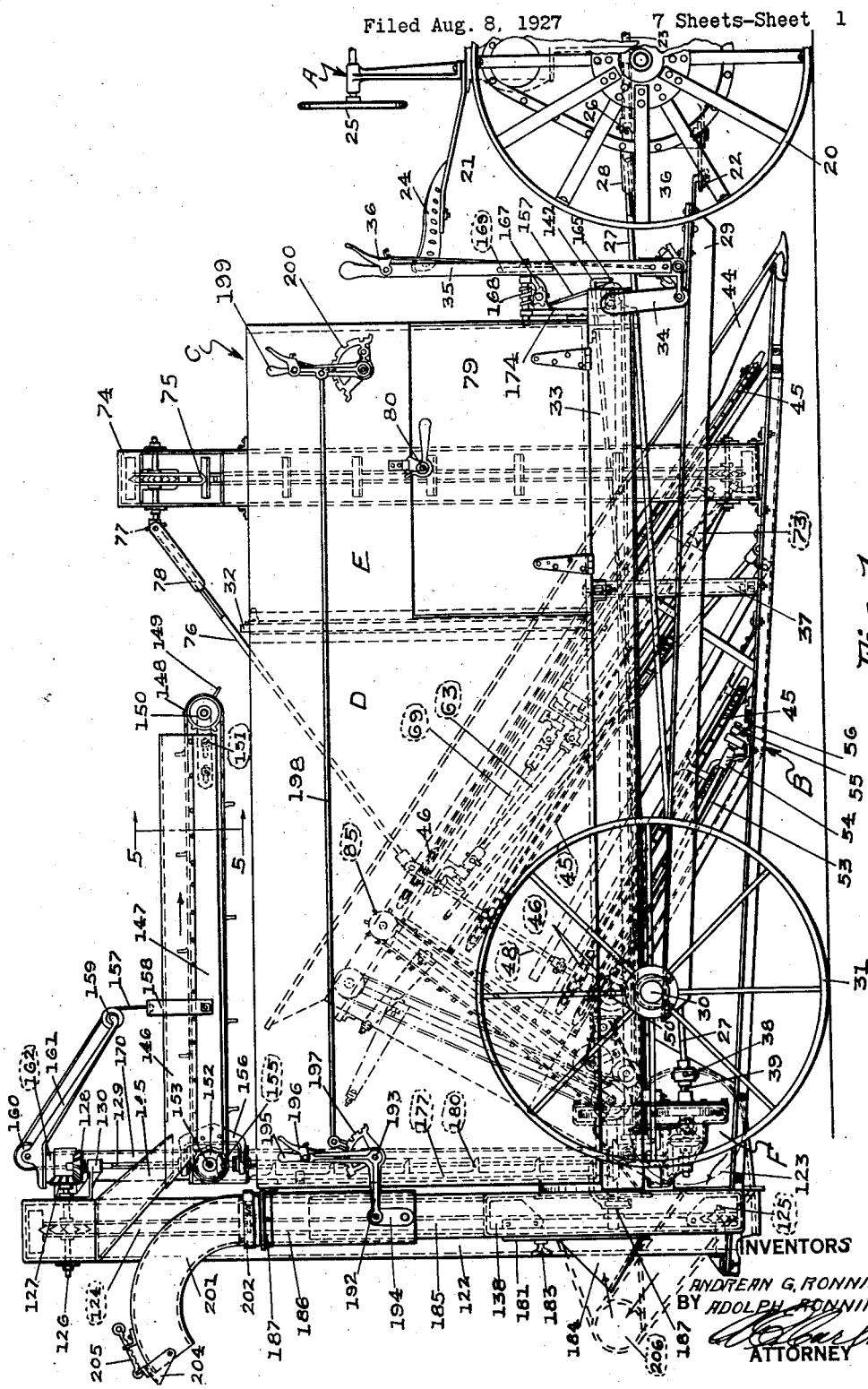

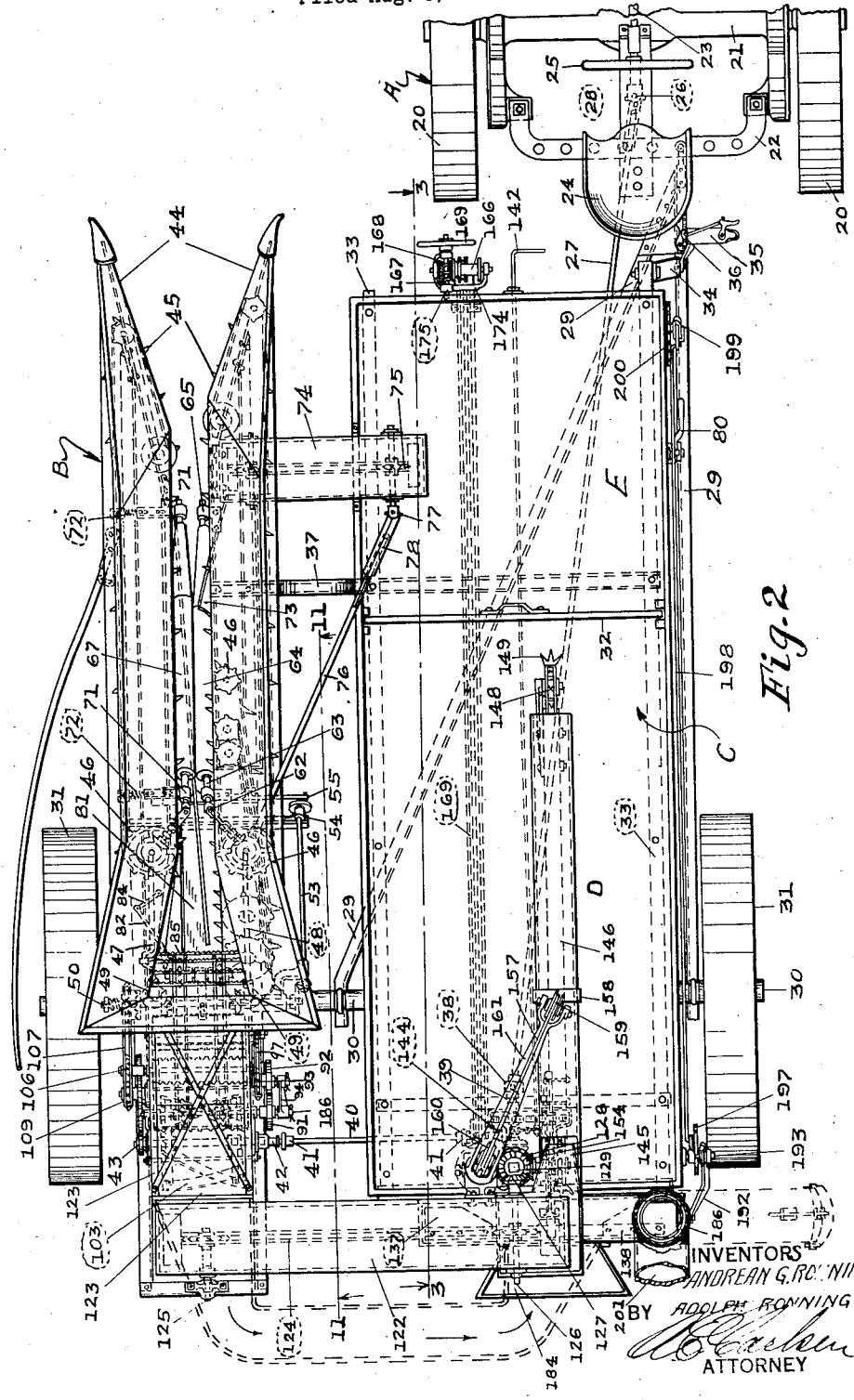

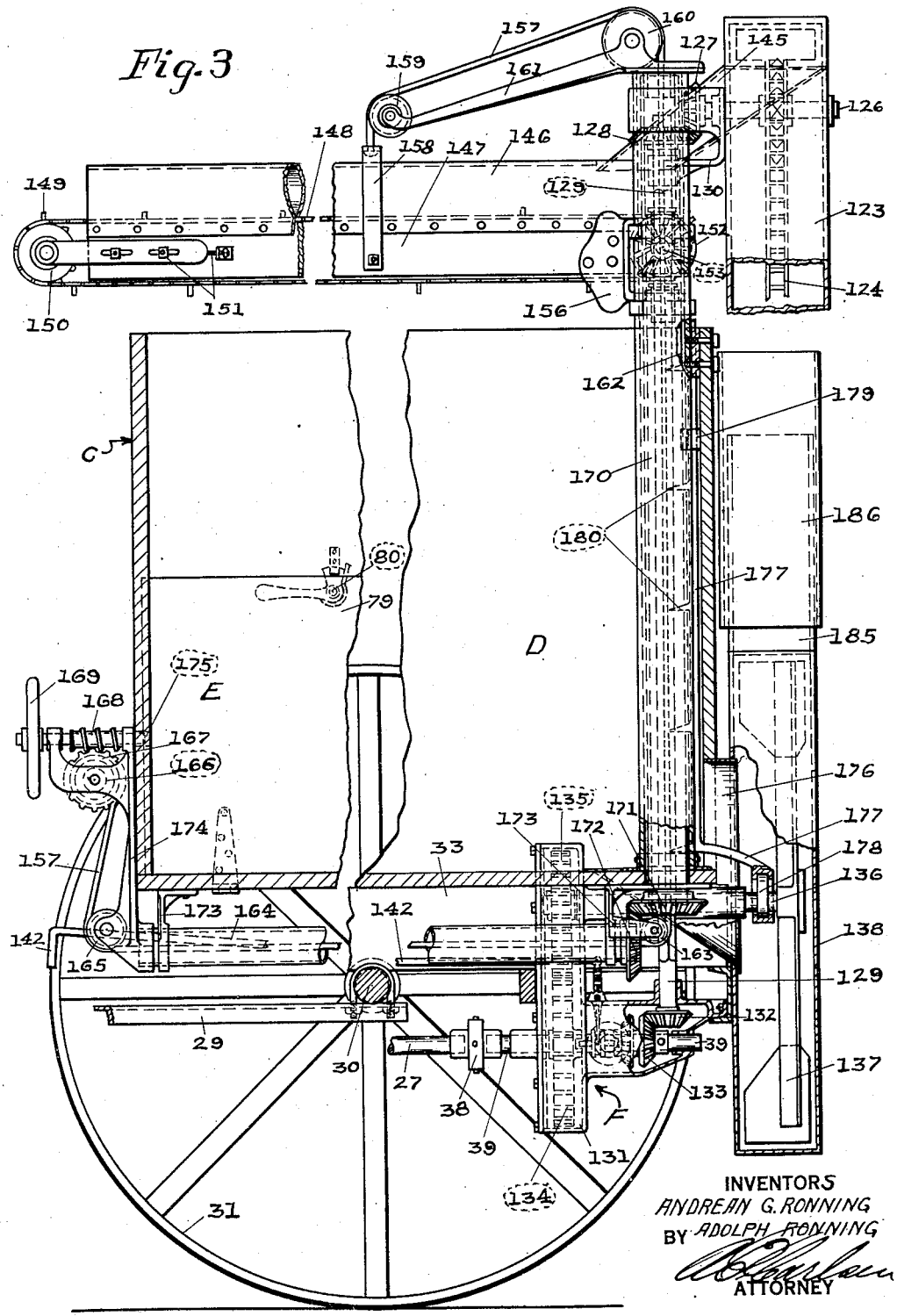

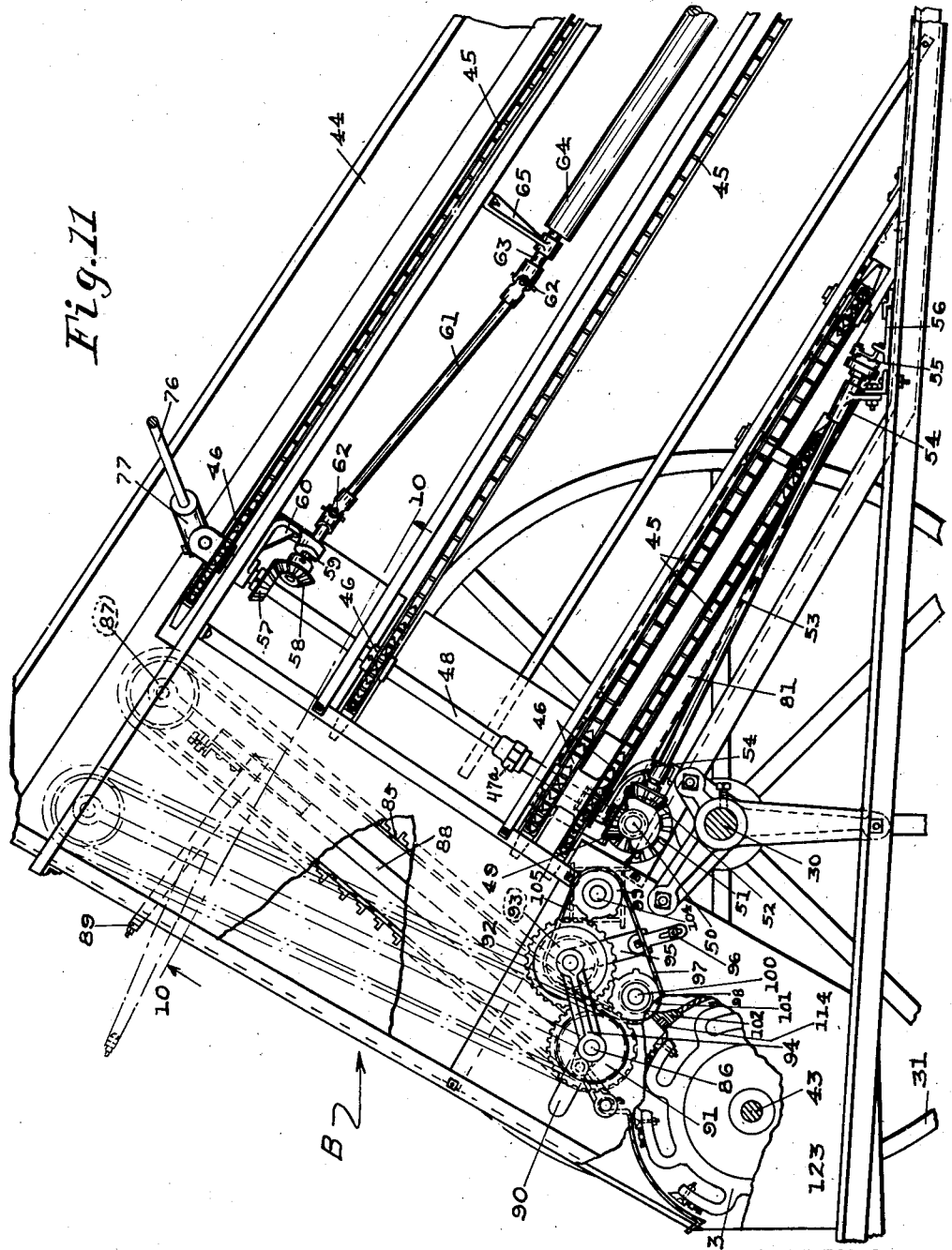

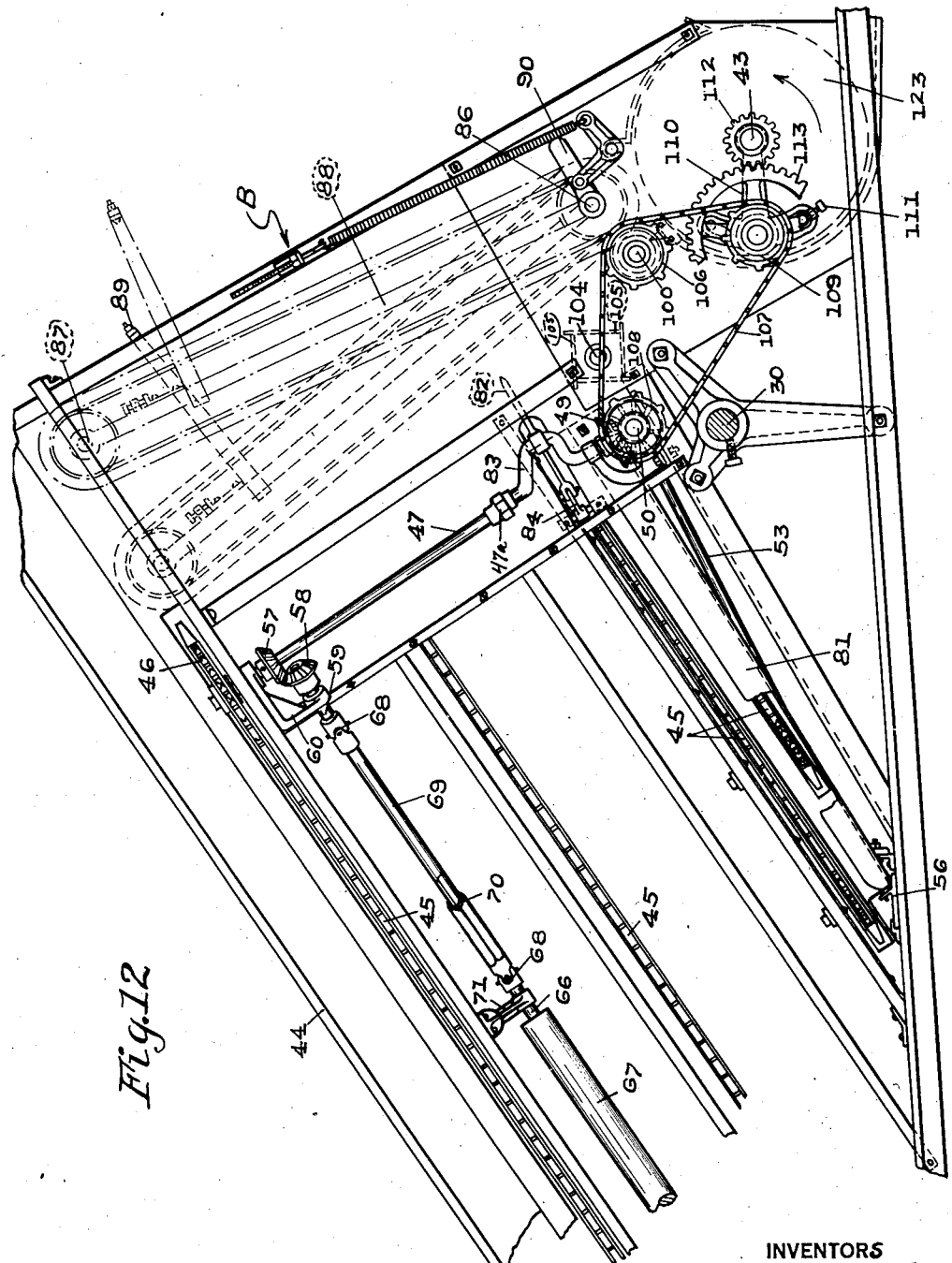

Oct. 18, 1932.  A. G. RONNING ET AL  1,883,402
HARVESTING MACHINE
Filed Aug. 8, 1927    7 Sheets-Sheet 7

INVENTORS
ANDREAN G. RONNING
ADOLPH RONNING
BY
ATTORNEY

Patented Oct. 18, 1932

1,883,402

UNITED STATES PATENT OFFICE

ANDREAN G. RONNING AND ADOLPH RONNING, OF MINNEAPOLIS, MINNESOTA; JACOB A. RONNING AND ADOLPH RONNING, EXECUTORS OF SAID ANDREAN G. RONNING, DECEASED

HARVESTING MACHINE

Application filed August 8, 1927. Serial No. 211,386.

This invention relates to machines for harvesting crops such as corn, and our primary object is to provide means for that purpose which is not only novel and efficient but which constitutes a considerable departure from hitherto known harvesting processes, and also constitutes a method or process for cutting and handling the cut crop which is a definite and distinct advance in the crop harvesting methods over that which is disclosed by the prior art and now found in commercial use. More specifically the machine is one which is particularly designed for traveling through a corn field, severing the stalks from the ground, reducing the stalks to ensilage, before or after the ears have first been removed, loading the cut material into a conveyor, and then delivering the material from the conveyor, either into a silo, or into an auxiliary conveyor, or upon the ground, and in which the required mechanisms are so arranged and coordinated that they are within the convenient control of a single operator.

Probably the first or at least the first most widely practiced method of reducing corn to ensilage was to cut and bind the stalks in the field, load them into wagons, and then haul them to the silo or storage bin, where they were reduced and elevated into the container. This method was slow, difficult and expensive, required large numbers of men and horses and often much of the twine became cut up with the silage, with sometimes serious consequences. As a result, that method has largely given way to a system, now largely used, and in which we have developed many inventions, consisting of a harvester which travels through the field, severs the stalks, cuts them into ensilage while traveling, and then loads the ensilage into wagons or trucks, by which it is carried to a blower or other conveying mechanism at the silo. Harvesters of this nature are shown in the following patents which typify to some extent the development of such machines: Weigel, 1,021,855; Spangler, 1,117,460; Gray, 1,256,683; and our own patents, including Nos. 1,161,252; 1,340,461; 1,485,201; 1,528,635; 1,532,266; 1,533,902.

The methods disclosed in these patents and as now used, greatly improved the earlier system. The twine bill is saved, there is no contact of the cut stalks with the ground, the binding and back breaking work to load the stalk bundles is eliminated, and fewer men and horses are required. But still the cost of producing silage is great, and almost prohibited for many classes of farmers. It requires the services of several men and horses (or tractors) in addition to the harvester and its power element. The harvester delivers the cut ensilage into wagons, and can of course only do so when the wagon is following along with it. When a full wagon is pulling away an empty one must be pulled up. In the meantime, the harvester, its traction power and operator, are all idle. Likewise the silo loader and its attendant are also periodically idle. All of this detracts from the efficiency of the system as a whole, and prolongs the silage cutting season which is short at its best.

To overcome all of these and many other objections, we have now designed a machine which can be operated, if desired, by one man only, and this operator cannot only cut the corn and reduce it to ensilage, but he can, under certain circumstances, also haul it to and deliver it into the silo or crib without the aid of any agency other than that of his one machine. To do this the harvester must obviously have a receptacle of its own, but, as will be explained, the receptacle is more than a receptacle, per se, because it co-operates with other mechanisms in a way that has never been done before and with a result that, to our knowledge, is entirely new. Thus, for instance, the harvester may, as it travels, deliver the corn either into its own receptacle or into one pulled along with it. When used as a single unit, the same power member which operates the harvester may also complete the one man opertion by emptying the receptacle at the silo. If he desires, the receptacle filling conveyor may be quickly shifted so that it will load into a wagon or truck traveling adjacent to the harvester. There are several advantages in this. In the first place the harvester can continue through the field without interruption, because while wagons are being changed the ensilage can be directed into the harvester receptacle. When this receptacle finally becomes filled it can be emptied, selectively, either into an accompanying wagon or may be driven to and emptied into the silo or loft. Additional wagons may be employed to advantage for instance on large farms which may already be partly equippd with hauling and silo loading euipment, or where several farmers in a community work together to jointly reduce their corn to silage. But even in such instances there are times when help is scarce, and when farmers find it inconvenient to work together, and then the dual purpose arrangement, mentioned, will permit the farmer to continue his harvesting alone, without help and without interruption.

Another object of the invention is to provide a machine that will remove the corn ears and then chop or reduce the stalk to ensilage or small particles, so as to kill insects, such as the corn borer, and leave the cut stalks in the field or will take it to the barn yard so that when it remains there for some time and is returned to the field in the form of fertilizer, it will not leave any insects or larva which can propagate itself.

A further object of the invention is to not only produce silage economically, but to bring the entire corn crop in from the field with as little cost and time as possible, so that it will become commercially practicable to utilize and prepare that part of the crop which the live stock does not ordinarily eat, and which by the present harvesting methods is now going to waste, and leaving the same in an ideal condition for briquetting as fuel, and other commercial purposes.

For many years we have had in mind the provision of means for the saving and utilization of the hundreds of millions of tons of that part of the corn crop which is annually going to waste under present methods of harvesting corn and farm practices with respect thereto. But we have long realized that in order to do so, and make it commercially practical in every way, the first and important step was to make a harvester of such a nature that it would enable the farmer to bring the corn crop in from the field and to the farmyard, or other suitable place, for briquetting and other conversion purposes, at the least possible expense and entailing the least possible amount of human and animal labor. For instance, if it costs say ten dollars per ton to bring the stalks from the field to a point suitable for briquetting purposes, it would be quite impractical to utilize corn stalks for fuel, paper, wall board, synthetic wood, chemicals, or for other public or commercial uses. We have invented several machines and methods for converting the stalks into such forms but we have not applied for patents on these machines, as yet, as we have considered them quite useless until we had fully solved the basic problem of harvesting the corn in such a manner that it would be feasible and practical to do so for such purposes.

We believe that the machine disclosed and described in this specification solves the problem, because it will enable one man, unaided, to harvest his entire crop in any desired fashion, for any desired purpose, and without the expenditure of any human labor aside from the mere operation of the machine. In short, the means and methods herein proposed, entirely dispense with the manual labor of handling the corn crop, and the construction of the machine is such that it will be comparatively cheap to build, and will be so efficient and economical in operation that it will greatly increase the farmer's income, and will not only render otherwise waste material useful, but will give to the public chemicals and by-products which are greatly needed in larger and more economical quantities.

The machine will now be described, reference being made to the accompanying drawings, in which:

Fig. 1 is a side elevation of our improved harvester, as seen from the right, and showing it as connected to the rear end of a tractor.

Fig. 2 is a plan view of the machine as shown in Fig. 1.

Fig. 3 is an enlarged sectional elevation about as on the line 3—3 in Fig. 2, but showing the main receptacle and upper feeding conveyor, with central sections broken out, and shortened up for purpose of illustration.

Fig. 4 is a rear elevation of a portion of the harvester showing its blower connection to an extended blower pipe for delivery into silo or other building.

Fig. 5 is an enlarged detail section on the line 5—5 in Fig. 1.

Fig. 6 is an enlarged detail view of a slip clutch device employed in the harvester mechanism proper.

Fig. 7 is an enlarged detail view of one of the yieldable snapping roller brackets.

Fig. 8 is a modified form of the clutch mechanism shown in Fig. 9.

Fig. 9 is an enlarged sectional detail view showing a dual clutch device, employed in connection with the power drive for the several mechanisms of the machine.

Fig. 10 is a sectional detail view on the line 10—10 in Fig. 11.

Fig. 11 is an enlarged detail view of the harvester unit proper, as on the line 11—11 in Fig. 2, but with fractional portions broken away.

Fig. 12 is a side elevation of the harvester unit as shown in Fig. 11, but from the other or left side of the machine.

Fig. 13 is a detail side elevation of the adjustable deflector for the blower pipe, as shown in Figures 1 and 2.

Figure 15:
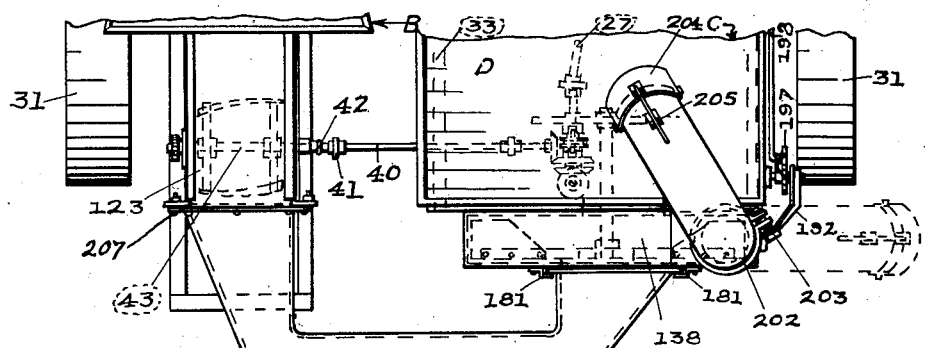
Fig. 15 is a plan view of the rear end of the machine shown in Fig. 14.

Referring to the drawings more particularly, and by reference characters, A designates a tractor or power unit (a part only of which is shown) having traction wheels 20, a frame 21, a draw bar 22, a power shaft 23, a seat 24, and a steering wheel 25, all of common and well known construction. The shaft 23 is connected by a universal joint 26 to a shaft 27 which extends back to give power to all of the harvesting and conveying mechanisms. The shaft 27 telescopes, as at 28, so that it will operate when adjusted to different lengths.

A substantially triangular frame 29 has its front end adjustably carried by the draw bar 22, while its rear end is carried by a transversely extended axle or shaft 30, which in turn is supported by a pair of lateral, widely spaced ground wheels 31. The harvester unit B, proper, is preferably arranged at the left side of the machine, directly inside the left wheel 31, while at the right side, and above the frame 29, we arrange a large receptacle C. The receptacle C is preferably provided with a removable partition 32, whereby it may be divided into two chambers D and E, the first of which is arranged to receive the reduced stalks, while the second is arranged to receive the snapped corn ears.

The receptacle C is carried upon a frame 33, which is tiltably supported at its rear, upon the shaft 30, but is vertically adjustable at its front end with respect to the front end of the frame 29. This front end adjustment is effected by a link 34 the position of which is regulated by a hand lever 35 having a locking mechanism 36, and which is within convenient reach of an operator at the tractor station 24. The frame 33 has a forward cross bar 37 which extends laterally to the left to support the front portion of the harvester B. Thus, both the receptacle C and the harvester B become simultaneously adjustable with the axle 30 as the tilting fulcrum.

The power shaft 27 is connected by a universal joint 38 to a splined stub shaft 39 of a transmission mechanism F (later to be described in detail) and from this mechanism extends a power shaft 40 which is connected by means of universal couplings 41 and coupling member 42 to shaft 43 of the harvester unit B, and the shaft 43 is employed to give power to all of the harvester mechanism carried by the unit B.

The harvester unit B, which will now be described in detail, embodies several distinct improvements over our previously mentioned and patented harvester, and is also a distinct improvement over the harvesters shown in our pending applications, Ser. Nos. 377,564, filed April 29, 1920; 657,176, filed August 13, 1923; 377,855, filed August 30, 1920; and 724,422, filed July 5, 1924, in several instances of which this application is a continuation in part as to various features.

The harvester comprises the usual gathering frames 44, having laterally arranged gathering chains 45, which receive the crop row and guides and impels it rearwardly, as the machine moves forwardly. These chains are all power driven, passing over sprocket gears 46 carried on substantially upright shafts 47 and 48 having bevel pinions 49 which mesh with similar pinions on a transverse shaft 50, which drives them. These shafts 47, 48 are sectionally formed and have flexible joints 47a. The shaft 50 also has a bevel gear 51 which meshes with and drives the bevel pinion 52 of a forwardly extending shaft 53 journaled in bearings 54. The forward end of the shaft 53 has a pitman connection 55 for driving the sickle bar 56. The sickle bar is thus caused to reciprocate in such a manner as to sever the stalks from the field so that they may be carried rearwardly by the gathering chains.

The upper end portions of the shafts 47 and 48 are provided with bevel pinions 57, which mesh with bevel pinions 58 of stub shafts 59 journaled in bearings 60. The right hand stub shaft 59 is operatively connected, by a connecting shaft 61 and universal joints 62 to the shaft 63 of a snapping roller 64, the same being carried by stationary journal bearings 65. The left shaft 59 is connected to the shaft 66 of a complementing snapping roller 67 by universal joints 68 and a shaft 69 which telescopes as at 70. The bearing 71, for the shaft 66, as shown in Figs. 2 and 7, are yieldable, springs 72 tending to press the rollers together. It will be noted that, with respect to the vertical, the snapping rollers 64 and 67 are entirely in advance of the stalk cutter 56, the object being to entirely remove the ears before the stalks are severed from the field. It may also be noted that the roller 67 is slightly higher than the roller 64, this being a well known method of deflecting the snapped ears to one side. To dispose of the ears we provide a chute 73 which receives the deflected ears and directs them into the lower end of the conveyor chute 74. This conveyor chute has an endless conveyor 75, which is driven from the shaft 48 through a shaft 76 and universal joints 77. The shaft 76 preferably telescopes, as at 78, to permit adjustment of the conveyor. Thus, the snapped ears are conveyed into the chamber E, from which they may be unloaded whenever necessary. Such unloading may be facilitated by opening the door 79 which is held shut by a latch 80, or by opening the partition 32.

Immediately after the stalks have been stripped of their ears by the snapping rollers, they are severed from the ground, by the sickle bar 56, and are then conveyed upwardly and rearwardly, in a substantially upright position, by the gathering and conveying chains 45, the upper set of which have of course engaged the stalks at the front end of the gathering frames.

As the stalks move rearwardly, with their butt ends traveling over an inclined deck 81, they are next engaged by a packer 82, which is operated by a crank 83, of the shaft 47, and is connected by a link 84 to the frame of the harvester. This packer engages the stalks just as they leave the rear ends of the gathering chains and packs them rearwardly against the downwardly moving surface of a feed apron unit 85. This apron unit is very similar, in construction and function, as well as in its association with other parts of the harvester, to the feed aprons disclosed in our copending applications Ser. No. 657,176 and Ser. No. 724,422, but may be briefly described as follows: The apron consists of an endless series of tooth cleats, all of which are carried on belts or chains which travel over sprockets of shaft 86 and rollers of shaft 87, and the shafts are journaled in bearings at the ends of an adjustable apron frame 88. The apron frame 88 is mounted for a floating action, so that the entire apron will be yieldable and will effectively engage and rest against the incoming stalk stream regardless of the volume of stalks therein. This floating or yielding action is made possible by reason of the fact that, except for a stop bracket 89 which limits the forward movement of the upper end of the apron, there is no other positive support for the apron except its shaft 86 and this is rearwardly movable in slots 90.

On the right side of the harvester unit the shaft 86 is provided with a spur gear 91 which meshes with a spur gear 92, to which is attached a sprocket gear 93. A link 94 serves to keep the proper operating radius between the gears 91 and 93. The gear unit 92—93 is journaled in the link 94 and in one end of an adjusting link 95 which is adjustably secured to the frame, as at 96, so that the tension of a sprocket chain 97, which drives the gear 93, may be adjusted. The chain 97 also passes over sprocket gears 98 and 99, and is driven by the former. The gear 98 is fastened on the shaft 100 of a feed roll 101 which has a combing engagement with a ledger plate 102 of a rotary ensilage cutter 103, which is carried on the shaft 43. The sprocket gear 99 is carried on a shaft 104 which is journaled in the frame and has an irregular beater roll 105, which receives the butt ends of the stalks, as they leave the deck 81, and impels and packs them rearwardly against the feed apron, and also downwardly into the tapering throat formed by it and the feed roll 101 in conjunction with the feed apron. It may be noted that the beater 105 is so arranged that it will act on the butts of the stalks before they are released from the gathering chains and so as to operate in the path of travel of the stalk butts leaving the deck 81.

The mechanism 86, 91, 92, 93, 97, 98, 99, 104 and 105 is driven by the shaft 100 which extends through the machine and is provided at its other or left end with a sprocket gear 106 that is driven by a chain 107 which also passes over sprocket gears 108 and 109. The sprocket gear 108 is carried on the shaft 50 which drives the gathering chains, the snapping rollers, the cutter bar, and the packer, as previously described. The gear 109 is trunnioned on an anchor shaped bracket 110, which pivots from the shaft center 43 but is preferably trunnioned on the bearing for the shaft 43. The bracket 110 is adjustable, by a set screw 111, so that the tension of the chain 107 may be regulated. Power is transmitted from the shaft 43 to the gear 109 by a spur pinion 112, secured on the shaft 43, and a spur gear 113 which rotates with the sprocket gear 109. Thus it will be seen that the movements of the feed apron, the feed rollers and the cutter are synchronized with the conveying and packing devices so that the corn cut by the primary cutter 56 will move in a positive, uninterrupted and uniform speed at all times. It may here be noted that the comb acting ledger plate 102 is provided with a cutter bar 114, which is rectangular in cross section so that it can be reversed and thereby utilize all its four sheering edges. Attention is here also called to Fig. 10, wherein we have shown the harvester frame as provided with stripper bars 115. These bars are so arranged that they will strip the stalks from the teeth 116 of the gathering chains, as the same start to move laterally on the upper gears 46, but the bars so diverge that they will not prevent the teeth from having a spreading action on the stalk stream to thereby present them to the entire surface of the feed belt 85. The construction of the frame 89 may also be noted in Fig. 10, wherein it will be seen that the apron frame has freedom for floating or self-adjusting movement against the corn, equal to the length of the offset frame sections 117.

It is important, in a machine of this kind, to provide means for releasing the power application to the feed and conveying devices in the event that clogging should for any reason occur. Otherwise it will frequently happen that chains are broken, and are sometimes even thrown into the ensilage cutter 103, and resulting in considerable damage. To overcome this difficulty we have provided the shaft 50 (see Figs. 2 and 6) with a friction release clutch consisting of a hub 118, pinned on the shaft, and a hub 119 slidable and rotatable on the shaft. These two clutch members (the latter of which is integral with the gear 108) have undulating adjoining faces, and are yieldingly held together by a spring 120, secured by an adjusting nut 121. As the chain 107 drives the gear 108 it will also drive the harvester mechanism connected to the shaft 50, but should any of such mechanism become clogged it will be seen that the unnatural condition caused by the increased resistance will cause the clutch member 119 to slip on the member 118, and as soon as the resulting rattle, produced by such slipping, is heard the operator can stop and repair or clean out the machine.

As the ensilage is cut by the cutter 103 it is conveyed away from the harvester unit proper by a conveying mechanism, shown in Figs. 1, 2 and 3, and which may be described as follows: An inclined conveyor chute 122 extends transversely across the back of the machine and from the casing 123 of the ensilage cutter to a position well above the rear end of the receptacle C. This chute has an endless conveyor 124 operating over shafts 125 and 126, the former of which is an idler, while the latter is a drive shaft and is provided with a bevel pinion 127 that meshes with and is driven by a bevel pinion 128 on the upper end of a shaft 129, journaled in bearing 130. The lower end of this shaft has a bearing in and extends into the housing 131 of the power transmission unit F, which is secured to and carried by the receptacle body C. The lower end of the shaft 129 has a bevel pinion 132 that meshes with and is driven by a similar pinion 133 on the shaft 39. Thus the conveyor 124 is always running when the power take-off shaft 27 is running.

The shaft 39 is also provided with a relatively large spur gear 134 that meshes with and drives, at a comparatively high speed, a pinion 135 on a shaft 136 of a blower or fan 137 in a blower housing 138. The gear wheel 134 is put into and out of active engagement with the shaft 39 by a clutch collar 139 on the splined portion of the shaft 39, controlled by a shipper lever 140. The position of this lever is maintained by a friction latch 141, but it is adjusted by a rod 142, which extends to a position where it is within convenient reach of the operator on the tractor seat 24. Thus, the operator can start and stop the blower at will, whether the machine is moving on the field or stands still.

The shaft 39 is further provided with a bevel pinion 143 which meshes with and drives the pinion 144 of the shaft 40, that operates the harvester unit. The pinion 143 may be keyed on the shaft 39 so as to constantly rotate with it, but it is preferable to control it with a clutch, as in Figs. 8 and 9, so that starting and stopping of the harvester mechanism will be possible at any time, and independent of the other mechanisms.

In the clutch shown in Fig. 8, it will be noted that, unless the pinion 143 is keyed, it could not be operated simultaneously with the wheel 134, but in Fig. 9 the same members can be rotated either selectively or simultaneously, because of the longer clutch block 139a.

The upper end of the conveyor chute 122 has an apron or spout 145 which delivers the cut particles of ensilage into the rear end of a horizontal, forwardly extending conveyor tube 146 carried on a board or frame 147 (see Figs. 1, 2, 3 and 5). An endless rake acting conveyor 148, having prongs 149, has its upper run operating forwardly in the chute 146, while its lower run operates rearwardly under the lower edge of the frame 147. The forward end of the conveyor 148 passes over an idler wheel 150, adjustable as at 151, while its rear end travels over and is driven by a sprocket wheel 152 that is mounted on a shaft 153, having a bevel pinion 154 that meshes with a bevel pinion 155. The latter pinion is carried by a bracket 156 and has a square hole that receives the square shank of the driving shaft 129, so that the pinions 154 and 155 will have freedom for vertical movement in the chamber D, together with the conveyor unit 146—148, but will always be driven by the shaft 129.

The conveyor unit 146—148 is raised and lowered by a cable 157 that is attached to a hanger strap 158 of the conveyor. The cable passes over pulleys 159 and 160, on an arm 161, and from thence passes down through a tube 162, over a pulley 163, through a horizontal tube 164, over a pulley 165, and terminates in windings on a drum 166 having a worm gear 167 meshing with a worm 168, which, in turn, is controlled by a hand wheel 169, also within reach of the tractor operator when on his seat 24. In addition to raising and lowering the conveyor, however, it is also necessary to provide means for shifting it (while operative) to a transverse position, with respect to the machine, and sometimes to various lateral positions within the box, for both delivery and unloading purposes, as will later be described. This we accomplish as follows: The arm 161 is rigidly mounted on the upper end of the tube 162, but the latter is mounted for rotation on a vertical axis, within an outer tube 170, secured in the receptacle C. The lower end of the tube 162 has a bevel pinion 171 that meshes with a similar pinion 172 on the rear end of the tube 164. The tube 164 is rotatable in bearings 173, and serves as a pivot for the bracket 174 that supports the members 166—169, so that the bracket can be swung in an arc over the front face of the receptacle C. The shaft of the worm 168 is mounted for a slight reciprocating movement in the bracket 174 and projects inwardly therebeyond for selective engagement with suitable holes 175 in the receptacle wall. The weight of the conveyor 146—147 affects a pull on the cable 157 that will in turn tend to always keep the worm end 168 in engagement with the hole 175 it engages, but by pulling on the wheel 169 the operator retracts the worm shaft, and this permits the bracket 164 to be swung to either side, with a resulting or corresponding swing to the conveyor.

As the ensilage is dropped from the apron 145 into the conveyor tube 146, it is carried forward and dropped into the fore end of the chamber D. As soon as it has piled up a sufficient height, however, the conveyor can be lowered and also swung from side to side if necessary, so that the under run of the conveyor members 148—149 will rake the pile back and thus keep its upper surface substantially horizontal, and thus permitting the receptacle to receive a full or maximum load.

The rearward, rake action of the members 148—149 is utilized for another purpose also, namely, to move the loaded ensilage rearward for unloading purposes, and with this in view we have provided the rear end of the receptacle C with a chute 176, through which the ensilage may pass from the chamber D and into the blower housing 138. When the chamber D is filled with ensilage the material at the bottom will be considerably compressed or packed, with a result that it would not readily feed into the blower unless means, in addition to the rake conveyor 149, were provided. We therefore provide a vertically reciprocating rake bar 177 at the rear end of the receptacle and above the chute 176. This bar has an arm extension 177 that is operated by an eccentric 178 on the blower shaft 136, and the bar itself guides in suitable bearings, such as 179, on the rear wall of the receptacle. The bar is provided with teeth 180, which are preferably slightly inclined so that the ensilage will be agitated downwardly.

As shown in Figs. 1, 2 and 4, the blower housing 138 has a pair of guides 181, a gate 182 slidable therein and secured as at 183, and a hopper 184, by means of which ensilage may be filled into a silo from a separate wagon or truck, when so desired.

The blower housing 138 is provided with an outlet spout 185 upon which is slidably mounted a pipe or cylinder 186 the same being provided near its upper end with a flange or ring 187. The pipe 186 is vertically movable so that it may be projected up into the mouth 188 of a silo filling pipe 189 as shown in Fig. 4. Such a pipe, 189, can be permanently secured as a fixture of the silo, but it is preferred to render its lower end slightly yieldable, by connecting it with a spring 190 to the silo or building wall 191, so that it will yield to the position of the blower when the machine is driven up to the silo. In order to complete the connection between 185 and 189, and to render it as tight as possible, the section 186 is lifted up. This is done by a crank lever 192, that is pivoted as at 193, and supports the sleeve or tube 186 by a connecting link 194. The other end of the lever has a handle 195 and a latch 196 for engagement with a notched segment 197, so that the tube 186 may be raised and lowered by the handle 195. The segment 197 is also pivoted, at 193, and is connected by a rod 198 to a hand lever 199, also within reach of the tractor operator. The lever 199 is adjustable with reference to a stationary segment 200. Thus while an adjustment of the pipe 186 may be made with the hand lever 195, to accommodate a certain height of silo tube 189, the main and most frequent adjustments will be made by the hand lever 199.

Figure 14:
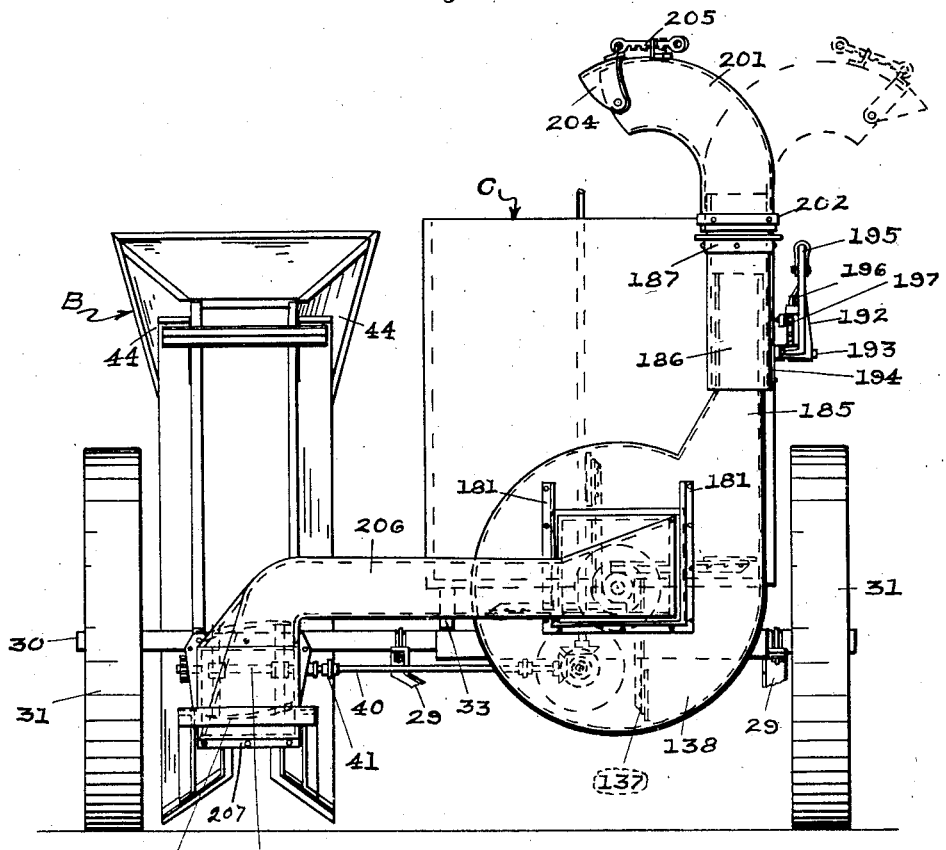
Fig. 14 is a rear view of the machine with various parts omitted and others added.

When it is desired to fill silage into a truck or wagon traveling or standing along side of the machine, or to deliver into a pit silo or comparatively low building or silo, or when the machine is arranged as shown in Figs. 14 and 15, or if it be desired to deposit or unload onto the ground, we provide a goose neck or elbow 201, the same fitting over the upper end of the section 186 and resting upon the ring 187. This elbow is secured by a clamping band 202, which, however, is provided with a spring and bolt 203, so that the elbow may be turned as desired. The outer end of the elbow 201 is provided with an adjustable deflector 204, having an adjusting rack bar 205.

As shown in Figs. 14 and 15 the goose neck 201 may be turned so as to deliver into the receptacle C. In this instance the machine has been considerably modified by omitting or removing most of the conveying devices, previously described, and substituting therefor a tubular member 206, or, if so desired, this member can be quickly attached to the machine, as shown by dotted lines in Figs. 1 and 2.

The left end of the tube conveyor 206 is secured, as at 207, to the open rear end of the ensilage cutter casing of the harvester unit, while its right end is secured in the guide members 181 of the blower housing. The housing members 182—184 have, of course, first been removed, and it is also necessary that the chute 176, from the chamber D to the blower housing, be closed up by a suitable door or gate (not shown). It will now be seen that the blower 13 will draw all the ensilage from the cutter 103 into the housing, and will selectively discharge it either into the box C, or into a wagon or truck along side, or will blow it up into the silo, as may be desired. When operating in the field the receptacle C can be filled and then hauled to the silo to be emptied therein, all by the same blower. If additional carriers are employed, they can be driven along side the receptacle and filled when in motion. While a filled wagon or truck is being driven away and another is about to take its place, it is not necessary to stop the harvester, as the crop may be temporarily diverted to the receptacle, and when such intermittent charges have filled the receptacle it can either be unloaded into another wagon, or truck, or be blown up into the silo, all by the same blower.

The machine as shown in Figs. 1, 2, and 3 has substantially the same functional possibilities. The conveyors 122 and 146 deliver the cut ensilage, from the harvester unit proper, either into the receptacle D or one drawn along side of it. The conveyor 146 also assists the blower in unloading the receptacle, either into an auxiliary receptacle or into the silo.

Thus it will be seen that the machine, as a whole, is of universal use in the harvesting process, and the various mechanisms described are all interrelated and dependent to a large extent upon each other in carrying out the structural and functional objects, which combine to form the inherent and valuable concept of the present invention.

It is understood that suitable modifications may be made in the general design and structural details of the invention as herein shown, provided, however, that said modifications come within the spirit and scope of the appended claims. Having now therefore fully shown and described our invention, what we claim to be new and desire to protect by Letters Patent is:

1. In a corn harvester, the combination of means for removing the ears from the stalks, means for severing the stalks from the field after the ears have been removed, and means for reducing the stalks into small particles.

2. In a traveling ensilage harvester having rearwardly moving guiding means for guiding the stalks through the machine as the latter travels forwardly, means for removing ears from the stalks as the machine moves forwardly, means for severing the stalks from the field after the ears have been removed, and means for reducing the stalks to ensilage.

3. In a traveling ensilage harvester having rearwardly moving guiding means for guiding the stalks through the machine as the latter travels forwardly, means for removing ears from the stalks as the machine moves forwardly, means for severing the stalks from the field after the ears have been removed, an ensilage cutter and means for feeding the stalks butt ends first into the ensilage cutter.

4. A harvesting machine comprising a harvester unit for removing the ears from standing stalks, subsequently severing the stalks from the field, reducing the stalks to small particles, and then separately conveying the particles and ears from the unit.

5. A harvesting machine comprising a harvester unit for removing the ears from standing stalks, subsequently severing the stalks from the field, reducing the stalks to small particles, and then separately conveying the particles and ears from the unit, to a conveying receptacle forming a part of the machine.

6. A harvesting machine comprising a wheel supported frame, a harvester unit and a receptacle carried by the frame, conveying means carried on the machine for conveying harvested crop from the harvester unit to the receptacle, and means disposed adjacent to the upper part of the receptacle for distributing the crop in the receptacle including horizontally movable devices adapted to act upon the crop in the receptacle.

7. A harvesting machine comprising a wheel supported frame, a harvester unit and a receptacle carried by the frame, conveying means carried on the machine for conveying harvested crop from the harvester unit to the receptacle, and means vertically adjustable within the receptacle for distributing the crop in the receptacle, said distributing means being operative to assist in unloading the receptacle.

8. A harvesting machine comprising a harvester unit and receptacle adapted to be drawn therewith over the field, an operator's station on the machine, means for conveying the harvested crop from the harvester unit to the receptacle, a blower carried with the receptacle for elevating the contents thereof into a silo or the like, and means, extending to within reach of an operator at said station, to effect an operative connection between the blower and a silo pipe.

9. A harvesting machine comprising a harvester unit having means for cutting the stalks from the field, means for removing ears from the stalks before the latter are cut from the field and delivering such ears to a receptacle carried by the machine, and means for reducing the stalks to ensilage and delivering them to a second receptacle.

10. A harvesting machine comprising a harvester unit having means for cutting the stalks from the field, means for removing ears from the stalks before the latter are cut from the field and delivering such ears to a receptacle carried by the machine, and means for reducing the stalks to ensilage and delivering them to a second receptacle, and means, carried by the machine, for removing the ensilage from the second receptacle.

11. An ensilage harvester comprising snapping rollers for removing ears from the standing stalks, means for delivering the ears from the machine, a cutter for severing the stalks from the field after the ears have first been removed, a second cutter for reducing the stalks to ensilage, and means for conveying such ensilage independent of the ear delivering means.

12. A harvesting machine comprising a frame adapted to be attached, at its front end, to a tractor, and having its rear end supported by spaced supporting wheels, a harvester unit tiltably supported by the frame, a receptacle carried by the frame and adapted to receive harvested crop from the harvester unit.

13. An ensilage harvesting machine comprising a harvester unit for cutting stalks and reducing them to ensilage, a receptacle carried by the machine, a blower carried by the receptacle and having tubular connection with the harvester whereby it may convey ensilage therefrom by creating a partial vacuum condition in the tubular connection, and deliver it selectively either to the said receptacle or to a second receptacle adjacent thereto.

14. An ensilage harvester comprising mechanisms for gathering, conveying and cutting a crop, power means for operating said mechanisms, and a yieldable friction clutch operatively connecting the power means with certain of said mechanisms whereby when such mechanisms are stopped by clogging or other unnatural conditions the clutch will yield and cease to operate such stopped mechanisms.

15. An ensilage harvester comprising mechanisms for gathering, conveying and cutting a crop, power means for operating said mechanisms, and a yieldable friction clutch operatively connecting the power means, with certain of said mechanisms whereby when such mechanisms are stopped by clogging or other unnatural conditions the clutch will yield and cease to operate such stopped mechanisms and means for adjusting the resistance that the clutch is required to overcome before ceasing to operate such clogged mechanisms.

16. An ensilage harvester comprising a primary cutter for severing stalks from the field, a secondary cutter for cutting the stalks into ensilage, means for conveying the stalks from the primary cutter to a feeding position with respect to the secondary cutter, a continuously moving feeding device adapted to receive said stalks, when in said feeding position, and feed them into the secondary cutter, and a packing device adapted to engage the stalks as they are about to leave the conveying means and pack them against the feeding device.

17. An ensilage harvester comprising a primary cutter for severing stalks from the field, a secondary cutter for cutting the stalks into ensilage, means for conveying the stalks from the primary cutter to a feeding position with respect to the secondary cutter, a continuously moving feeding device adapted to receive said stalks, when in said feeding position, and feed them into the secondary cutter, and a packing device adapted to engage the stalks as they are about to leave the conveying means and pack them against the feeding device, said conveying means, packing device, and feeding device comprising means for positively and continuously acting upon the stalks while passing from the primary cutter to the secondary cutter.

18. A traveling corn harvester comprising means for removing ears from the stalks as the machine travels over the field leaving the stalks intact, and means for cutting the stalks after the ears have been removed therefrom.

19. In a traveling harvester, the combination including guiding means to receive the standing crop as the machine advances over the field, means for removing a part of the crop while still standing in the field, and means for severing and conveying the balance of the crop, from the field, after the removing means has first functioned.

20. In a traveling harvester having rearwardly moving guiding means for guiding standing crop stalks through the machine as the latter travels forwardly, means for removing crop elements from the stalks as the machine moves forwardly, and means for severing and reducing the stalks after said elements have been removed.

21. In a traveling harvester having rearwardly moving guiding means for guiding standing crop stalks through the machine as the latter travels forwardly, means for removing crop elements from the stalks as the machine moves forwardly, means for severing the stalks from the field after such elements have been removed, and means for treating the severed stalks.

22. A harvesting machine comprising a harvester unit and a receptacle adapted to be drawn therewith over the field, a power unit connected to the machine for propelling the same, means connected with the power unit for operating the harvester, for delivering harvested crop therefrom to the receptacle, and mechanical means operative in the receptacle driven by the power unit for distributing the crop load in the receptacle and for unloading the receptacle while the power unit remains connected to the machine.

23. In a harvesting machine, a harvester unit for harvesting a crop, a receptacle carried by the machine for receiving harvested crop from the unit power driven devices for physically engaging the crop load in the receptacle to spread the same therein, and a conveyor for unloading harvested material out of the receptacle.

24. A traveling agricultural machine comprising means for removing the grain portion from standing vegetation, means for severing the standing vegetation from the field after said grain portion has been removed, and means for changing the physical characteristics of the vegetation after the same has been severed from the ground.

25. In a machine of the character described, the combination including a mechanism for removing the grain portion from standing vegetation, means for severing the vegetation from the ground and means for reducing to relatively smaller parts the vegetation from which the grain portion has been removed, and after such vegetation has been severed from the ground.

26. In a traveling harvester, a combination including means for removing ears from standing corn, means for severing the stalks from the ground after the ears have been removed, and means for receiving and reducing the stalks after they have been severed from the ground.

27. In a corn harvester, the combination including a snapping mechanism to remove ears of corn from the standing stalks, a cutter to sever the standing stalks from the ground, and a mechanism to reduce the severed corn stalks.

28. A traveling harvester comprising means for removing the grain crop from standing vegetation as the machine moves forward, means for severing the vegetation from the field after the grain crop has been removed, and means for receiving and reducing the vegetation thus severed.

29. A traveling corn harvesting machine comprising, a receptacle, means for removing ears from standing stalks and delivering them to said receptacle, leaving the stalks intact and means for severing the stalks from the ground after the ears have first been removed.

30. A traveling harvester comprising means for removing ears from standing stalks, as the harvester moves over the field, a receptacle, means for conveying the removed ears to the receptacle, means for severing the stalks from the field, and means for conveying and reducing the severed stalks.

31. A traveling harvester comprising means for removing ears from standing stalks, as the harvester moves over the field, a receptacle, means for severing the stalks from the field, and means for conveying the severed stalk material to the receptacle.

32. A traveling harvester comprising means for removing ears from standing stalks, as the harvester moves over the field, a receptacle, means for severing the stalks from the field, and means for conveying the stalk material to the receptacle, said receptacle having two chambers for respectively receiving the ears and stalk material.

33. The combination with a harvester having a cutter for cutting a crop into relatively small particles, of a suction device remote from the cutter and having a tubular connection with the cutter for conveying the cut crop therefrom by creating a suction draft through the connection.

34. A traveling harvester comprising means for engaging a standing crop to remove certain portions thereof as the machine advances over the field, means for severing substantially the entire balance of the crop from the field, after such portions have been removed, and means for reducing said severed balance of crop into relatively small particles.

35. A traveling harvester comprising means for engaging a standing crop to remove certain portions thereof as the machine advances over the field, means for severing substantially the entire balance of the crop from the field, after such portions have been removed, means for reducing said crop balance into relatively small parts, and means for simultaneously operating said removing, severing, and reducing means.

In testimony whereof, we affix our signatures, at Minneapolis, Minnesota, this 3rd day of August, 1927.

ANDREAN G. RONNING.
ADOLPH RONNING.